(12) United States Patent
Tatomir

(10) Patent No.: US 8,899,867 B2
(45) Date of Patent: Dec. 2, 2014

(54) MOUNTING ASSEMBLY FOR A FACE SHIELD

(76) Inventor: Wally Wayne Tatomir, Raleigh, NC (US)

(*) Notice: Subject to any disclaimer, the term of this patent is extended or adjusted under 35 U.S.C. 154(b) by 710 days.

(21) Appl. No.: 13/038,427

(22) Filed: Mar. 2, 2011

(65) Prior Publication Data

US 2012/0222198 A1    Sep. 6, 2012

(51) Int. Cl.
*A63B 71/10* (2006.01)
*A42B 3/20* (2006.01)
*A42B 3/04* (2006.01)

(52) U.S. Cl.
CPC .... *A42B 3/20* (2013.01); *A42B 3/04* (2013.01)
USPC .................................. 403/168; 403/408.1

(58) Field of Classification Search
USPC ............. 403/167, 168, 408.1; 2/6.3, 6.7, 422, 2/424, 425
See application file for complete search history.

(56) References Cited

U.S. PATENT DOCUMENTS

| | | | | |
|---|---|---|---|---|
| 3,263,236 A | * | 8/1966 | Humphrey | 2/9 |
| 3,348,596 A | * | 10/1967 | Leitner | 411/180 |
| 3,984,875 A | * | 10/1976 | Farquharson | 2/10 |
| 4,370,759 A | * | 2/1983 | Zide | 2/424 |
| 4,448,565 A | * | 5/1984 | Peterson | 403/408.1 |
| 5,095,552 A | * | 3/1992 | Parkinson | 2/424 |
| 5,676,510 A | * | 10/1997 | Fischer et al. | 411/84 |
| 5,978,973 A | * | 11/1999 | Chartrand | 2/422 |
| 6,038,740 A | * | 3/2000 | Hoger et al. | 411/84 |
| 6,079,053 A | * | 6/2000 | Clover et al. | 2/424 |
| 6,202,223 B1 | * | 3/2001 | Chartrand | 2/410 |
| 6,934,971 B2 | * | 8/2005 | Ide et al. | 2/425 |
| 2008/0189836 A1 | * | 8/2008 | Goodhand et al. | 2/424 |

* cited by examiner

*Primary Examiner* — Michael P Ferguson
(74) *Attorney, Agent, or Firm* — Coats and Bennett, PLLC

(57) ABSTRACT

A face shield, such as a visor, mounts to a protective helmet using a mounting assembly. The mounting assembly has a base, a spacer assembly, and a pair of posts. The base is disposed on the interior of the helmet. The posts are connected to the base and extend outwardly through holes that are formed in the side of the helmet. The spacer assembly slides over the posts when the posts are inserted through the corresponding holes in the helmet, and frictionally engages the outer surfaces of the first and second posts such that the helmet is disposed between the base and the spacer assembly. The posts threadingly receive corresponding fasteners that attach the face shield to the helmet.

7 Claims, 7 Drawing Sheets

MOUNTING ASSEMBLY FOR A FACE SHIELD

FIELD OF THE INVENTION

The present invention relates generally to face shields for protective headgear, and particularly to mounting assemblies for removably attaching a protective face shield to a headgear.

BACKGROUND

People wear protective headgear or helmets to help prevent head injuries. In many cases, the headgear also includes a face shield, cage, or visor that attaches to the headgear to provide additional protection for a person's face and eyes. By way of example, ice hockey players regularly wear a protective helmet with a face shield, cage, or visor to protect their heads and faces from possible injuries due to impact with objects such as the ice surface, other players, the boards, the puck, and sticks.

Conventionally, multiple mechanical fasteners, such as screws, are used to attach the face shield to each side of the helmet. Each screw passes through corresponding holes formed in the face shield and helmet, and into respective threaded nuts disposed on the inside of the helmet. However, attaching a face shield to a helmet using such conventional hardware is problematic and frustrating. Specifically, face shields are usually manufactured from a high impact-resistant, clear plastic. Although they generally conform to the shape of the front of the helmet to surround the front of a player's face, the terminal ends of the shield tend to bias outwardly away from the exterior surface of the helmet. This biasing force resists a user's efforts at initially attaching the face shield to the helmet. Additionally, when removing the face shield, the biasing force may "fling" the screws and/or other mounting assembly components away from the helmet if the user does not carefully prevent this from happening.

SUMMARY

The present invention provides a mounting assembly for attaching protective face shields to protective headgear. The helmet will protect a wearer's head from injuries that could occur due to contact with other objects. The face shield will help to protect the eyes and at least part of the wearer's face.

In one embodiment, the mounting assembly comprises a rectangular base, first and second posts, and a spacer assembly. The base has a substantially planar surface and is configured to be disposed on the interior of the helmet. The posts may be cylindrical and are connected to the base. When installed, the posts extend outwardly from the base through corresponding holes formed in the side of the protective helmet. The posts are configured to threadingly receive one or more mechanical fasteners that attach the face shield to the helmet. The spacer assembly, which may comprise one or more spacers, includes through holes that allow the spacer assembly to slide over the extended posts. The through holes are sized to fit tightly over the exterior surfaces of the extended posts such that the helmet is disposed between the planar surface of the base and the spacer assembly. Such frictional engagement between the spacer assembly and the outer surfaces of the extended posts maintains the base securely in place on the inside of the helmet during the installation and removal of the face shield.

The face shield, which may be a visor, for example, includes slots that align with the holes in the spacer assembly and the posts. Mechanical fasteners, such as screws, extend through the slots in the face shield and thread into the posts to secure the face shield to the helmet. In some embodiments, the spacer assembly may include a raised ridge. The ridge is sized and shaped to fit within the slots in the shield. The slots allow the ridge to move freely forward and backward along the slot, and thus, helps the user to install the face shield.

Of course, those skilled in the art will appreciate that the present invention is not limited to the above contexts or examples, and will recognize additional features and advantages upon reading the following detailed description and upon viewing the accompanying drawings.

DETAILED DESCRIPTION

The present invention provides a mounting assembly for attaching protective face shields to protective headgear. The helmet will protect a wearer's head from injuries that could occur due to contact with other objects, while the face shield will help protect the eyes and at least part of the wearer's face. Some suitable examples of protective helmets having face shields include, but are not limited to, helmets used by fire, police, and/or other rescue personnel, as well as those worn by construction personnel, and sports figures participating in a sport that requires the use of helmets.

As stated previously, conventional face shields attach to protective helmets using multiple screws. Each screw extends through the face shield and the helmet, and anchors into a corresponding T-nut positioned within the interior of the helmet. Although they secure the face shield to the helmet, conventional components are small and difficult to manipulate simultaneously with the helmet and the face shield. Further, whomever installs the face shield must maintain a constant pressure or force on multiple components (e.g., the helmet, shield, T-nut, screw) during the installation process until the screw initially engages the threads on the corresponding T-nut. The user must also maintain a similar pressure on these components during the removal process to prevent the "biased" shield from flinging the screws and/or other components across a room.

Thus, conventional methods of attachment are problematic and frustrating, and are prone to the loss of the hardware needed to secure the face shield to the helmet. The present invention, however, obviates these problems by providing a mounting assembly that releasably secures the face shield to the helmet. The mounting assembly comprises component parts that are easier to manipulate than are the individual fasteners of the prior art. This negates the need for a user installing or removing the face shield to simultaneously apply a continual pressure or force to multiple components. Thus, with the mounting assembly of the present invention, it is easier for the user to hold and align both the face shield and the helmet while attaching and removing the face shield to/from the helmet.

Figure 1:
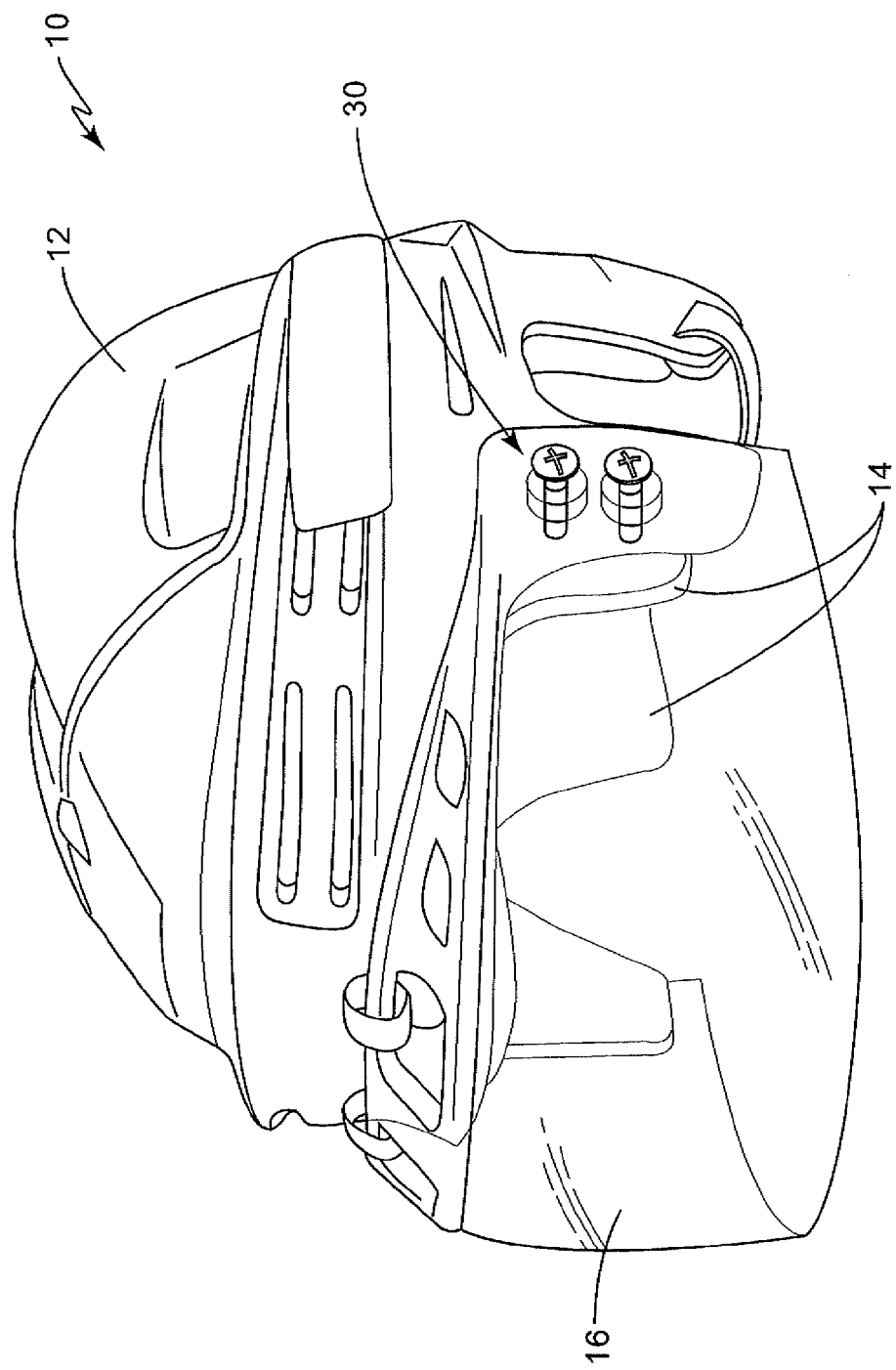
FIG. 1 is a perspective view of a protective face shield attached to protective headgear according to one embodiment of the present invention.

Turning now to the drawings, FIG. 1 is a perspective view illustrating a protective headgear of the type typically used by players in the sport of ice hockey. Those skilled in the art will readily appreciate that the use of an ice hockey helmet 10 is illustrative only. The present invention may, in fact, be utilized for releasably securing protective face shields to other types of protective headgear.

As seen in FIG. 1, the protective headgear 10 comprises a helmet 12 and a face shield 16. The helmet 12 and the face shield 16 may comprise any known helmet and/or face shield known in the art, and are generally manufactured by companies such as BAUER, CCM, EASTON, NIKE, ITECH, JOFFA, and CASCADE. As described in more detail later, a mounting assembly 30 configured according to one embodiment of the present invention attaches one end of the face shield 16 to the a first side of helmet 12. Although not specifically seen in FIG. 1, another mounting assembly 30 is present on the opposite side of helmet 12 to attach the other end of the face shield 16 to the other side of helmet 12.

Helmet 12 is typically constructed from a high impact-resistant plastic, and includes a specially formulated protective foam 14 affixed to the interior. Generally, the foam 14 covers most or all of the interior of helmet 12, and is able to sufficiently absorb a kinetic impact to protect the wearer to reduce the chance of concussion-related injuries. Some suitable types of foam 16 include, but are not limited to, Expanded Polypropylene (EPP) foam and Fused Expanded Polypropylene (FXPP) foam.

The face shield 16 is arcuately shaped to generally conform to the shape of the front of helmet 12 and the player's face. The face shield 16 is transparent and attaches to the helmet 12 at each lateral side using a mounting assembly 30 configured according to the present invention. Like helmet 12, the face shield 16 is manufactured from a high impact-resistant plastic to specifically protect the player's eyes and at least a portion of the player's face from being injured by objects such as the puck, sticks, the ice surface, the boards, and the bodies of the other players.

There are different types of protective face shields 16 suitable for use with the present invention. As seen in FIG. 1, for example, the face shield 16 comprises a type of protective shield known as a "visor" or "half-shield." The term "visor" is typically used to describe a protective shield that covers and protects only the upper part of the player's face while leaving the lower part of the player's face open and uncovered. Another type of face shield suitable for use with the present invention, however, is a "full face shield." The term "full face shield" is typically used to describe a transparent protective shield that covers most or all of the player's entire face. Similarly, a "cage" is sometimes used as a protective face shield. A "cage" is a term used to describe a metallic mesh formed as a grid that attaches to the front and sides of the helmet to cover and protects a person's entire face.

Regardless of the specific type of protective face shield, however, the term "face shield" is used herein to generically refer to all three types of protective face shields—the "visor," the "full face shield," and the "cage." Thus, although the presently illustrated embodiments show only a visor, those skilled in the art should appreciate that this is for illustrative purposes only. The mounting assembly 30 of the present invention may be used to mount a visor, a full face shield, or a cage to helmet 12.

Figure 2:
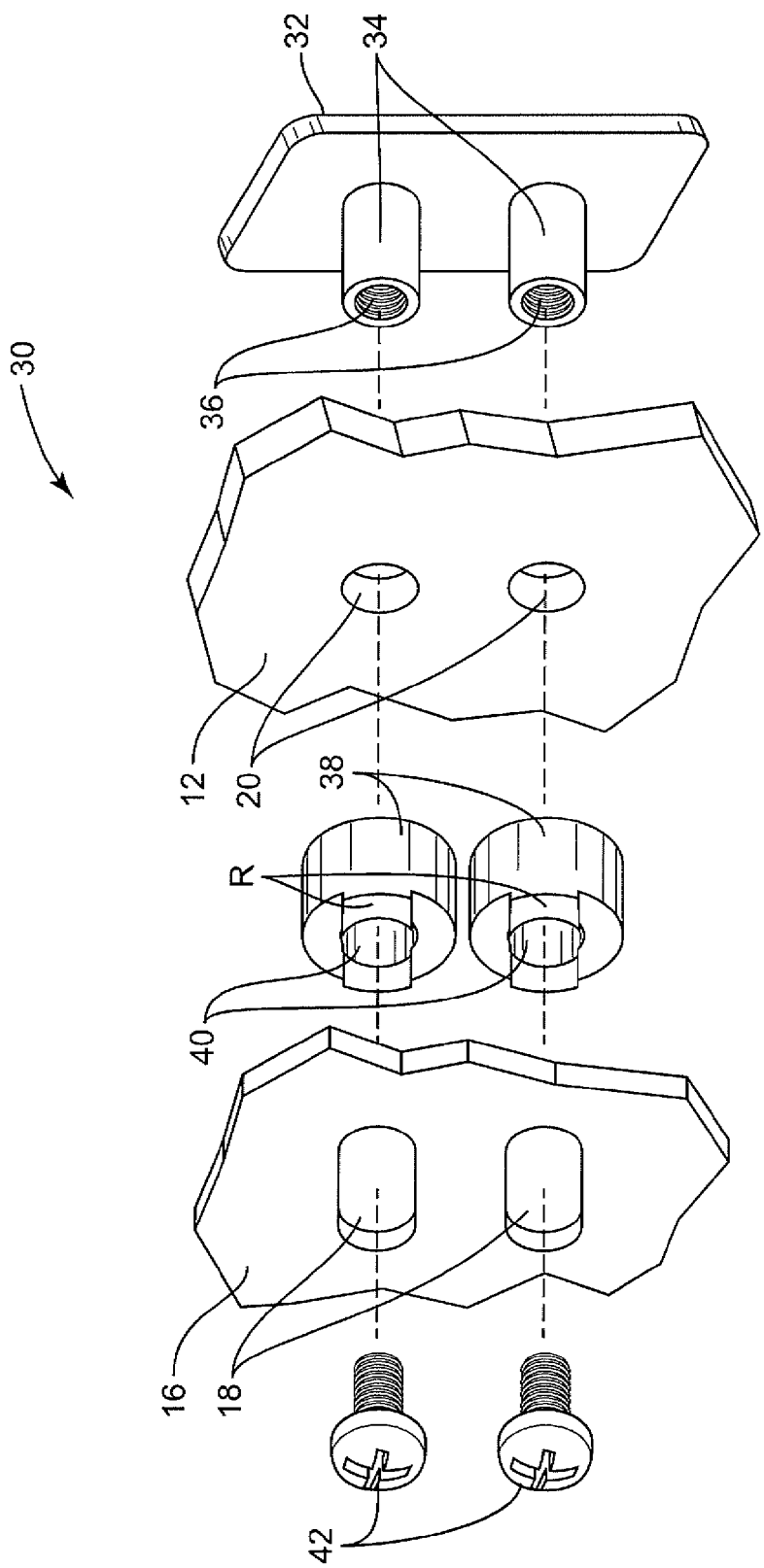
FIG. 2 is an exploded view of the mounting assembly according to one embodiment of the present invention.

FIG. 2 is an exploded view illustrating a mounting assembly 30 configured according to one embodiment of the present invention and how it mounts the face shield 16 to helmet 12. As seen in FIG. 2, the mounting assembly 30 comprises a substantially rectangular base 32 and a pair of cylindrical posts 34 affixed to, and extending outwardly from the base 32. Each post 34 is approximately the same size and is includes a first threaded interior receptacle 36. The base 32 and the posts 34 may be manufactured separately and fixedly attached to each other, or cast or molded as a unitary piece. Further, base 32 may be manufactured from any material known in the art. Suitable materials include, but are not limited to, any kind of metal or metal alloy and high impact-resistant plastics.

The mounting assembly 30 further comprises a spacer assembly comprising first and second spacers 38. As seen in FIG. 2, the first and second spacers 38 are two independent and distinct objects; however, as seen in later embodiments, this is not required. Each spacer 38 is disposed on the exterior of the helmet 12, and includes a through hole 40 extending through the spacer 38. The holes 40 are sized and shaped to conform to the exterior surfaces of the posts 34. Specifically, the posts 34 extend outwardly from the base 32 through holes 20 in the sides of helmet 12 and into the through holes 40 of spacers 38. The posts 34 will not extend entirely through the holes 40 to contact the face shield 16. The posts 34 will only extend far enough into the holes 40 such that the terminal ends of posts 34 are substantially flush with, or slightly below, the surface of the spacers 38. When installed, the spacer assembly frictionally engages the outer surfaces of the first and second posts 34 such that the helmet 12 is disposed between the base 32 and the spacers 38.

In some embodiments, one or both of the spacers 38 also include a raised ridge R. The ridges R are formed on the surface, and are sized to seat within the horizontally-oriented slots 18 of face shield 16. The slots 18 may be long enough to allow for some lateral movement (i.e., forward and rearward movement) of the face shield 16 to facilitate the user aligning the shield 16 during the installation of the shield 16. Once installed, the ridges R prevent the inadvertent rotation or movement of the face shield 16 due to factors such as the high-impact forces and/or torque associated with a violent collision with another person or object.

The mounting assembly 30 also comprises a pair of mechanical fasteners 42 to attach the face shield 16 to the helmet 12. Generally, as seen in the figures, the mechanical fasteners 42 comprise first and second screws; however, this is not required. The mechanical fasteners 42 may comprise any mechanical fastener known in the art. In use, the fasteners 42 extend through corresponding slots 18 formed in the face shield 16 and threadingly engage the corresponding interior receptacles 36. When attached to the posts 34, fasteners 42 sufficiently secure the face shield 16 to helmet 12.

Figure 3B:
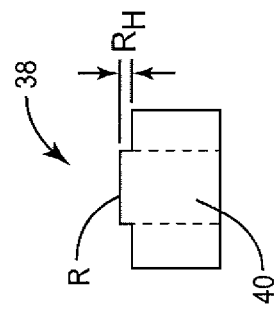
FIGS. 3A-3C are plan views illustrating the mounting assembly components according to one or more embodiments of the present invention.
Figure 3C:
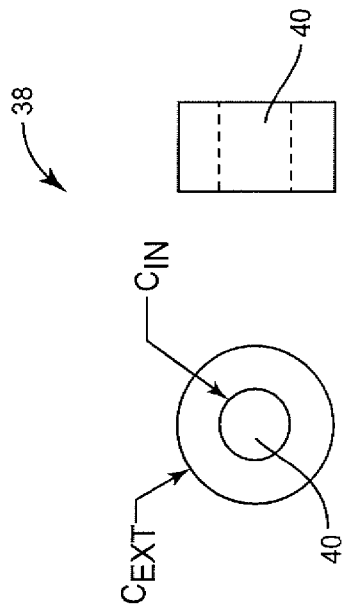
Figure 3A:
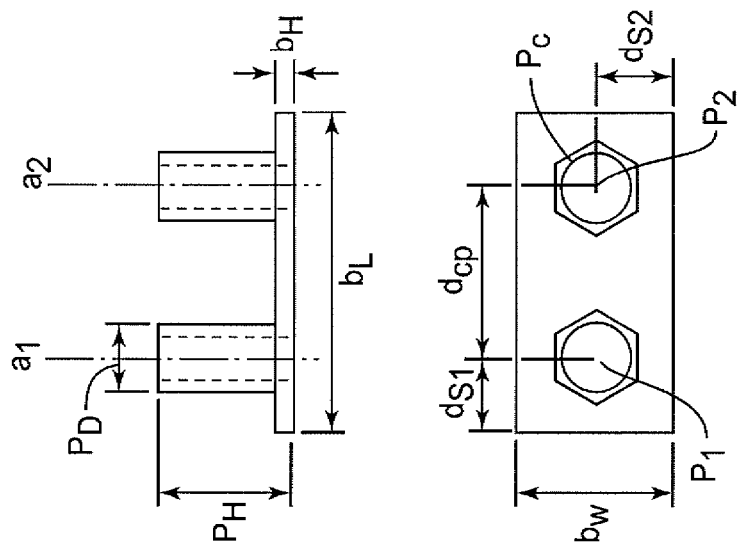

The dimensions of the mounting assembly 30 components may be any dimensions needed or desired. However, in one embodiment, the dimensions and structure of the protective face shield 16 and helmet 12 largely define the dimensions of the mounting assembly 30 components. For example, the mounting assembly 30 seen in FIGS. 3A-3C is for ice hockey helmets. In such embodiments, the base 32 (see FIG. 3A) has a length $b_L$ of approximately 1 inch, a width $b_W$ of about 0.5 inches, and a height $b_H$ of about 0.06 inches. Each post 34 has a height $p_H$ of approximately 0.44 inches measured from the surface of the base 32, and has an outer diameter $p_D$ of approximately 0.21 inches. Each post 34 is further positioned on the surface of the base 32 such that their respective center points $p_1$, $p_2$ are separated by a distance $d_{CP}$ of approximately 0.54 inches apart. Additionally, the posts 34 are located on the base 32 such that each center point $p_1$, $p_2$ is located approximately a first distance $d_{S1}$ of about 0.23 inches from a corresponding short side of the base 32, and a second distance $d_{S2}$ of about 0.25 inches from a corresponding long side of the base 32.

An exemplary spacer 38 is seen in FIG. 3B. Each spacer 38 has a thickness of about 0.275 inches. The inner circumference $C_{IN}$ of the hole 40 is about 0.21 inches, and the outer circumference $C_{EXT}$ of spacer 38 is about 0.5 inches. In embodiments where the spacer 38 has a ridge R (FIG. 3C). The ridge R is raised about 0.06 inches from the surface of the spacer 38. Regardless of the embodiment, the spacers 38 may be constructed of any known material; however, in at least one embodiment, the spacers 38 are manufactured from DEL-RIN.

Figure 4:
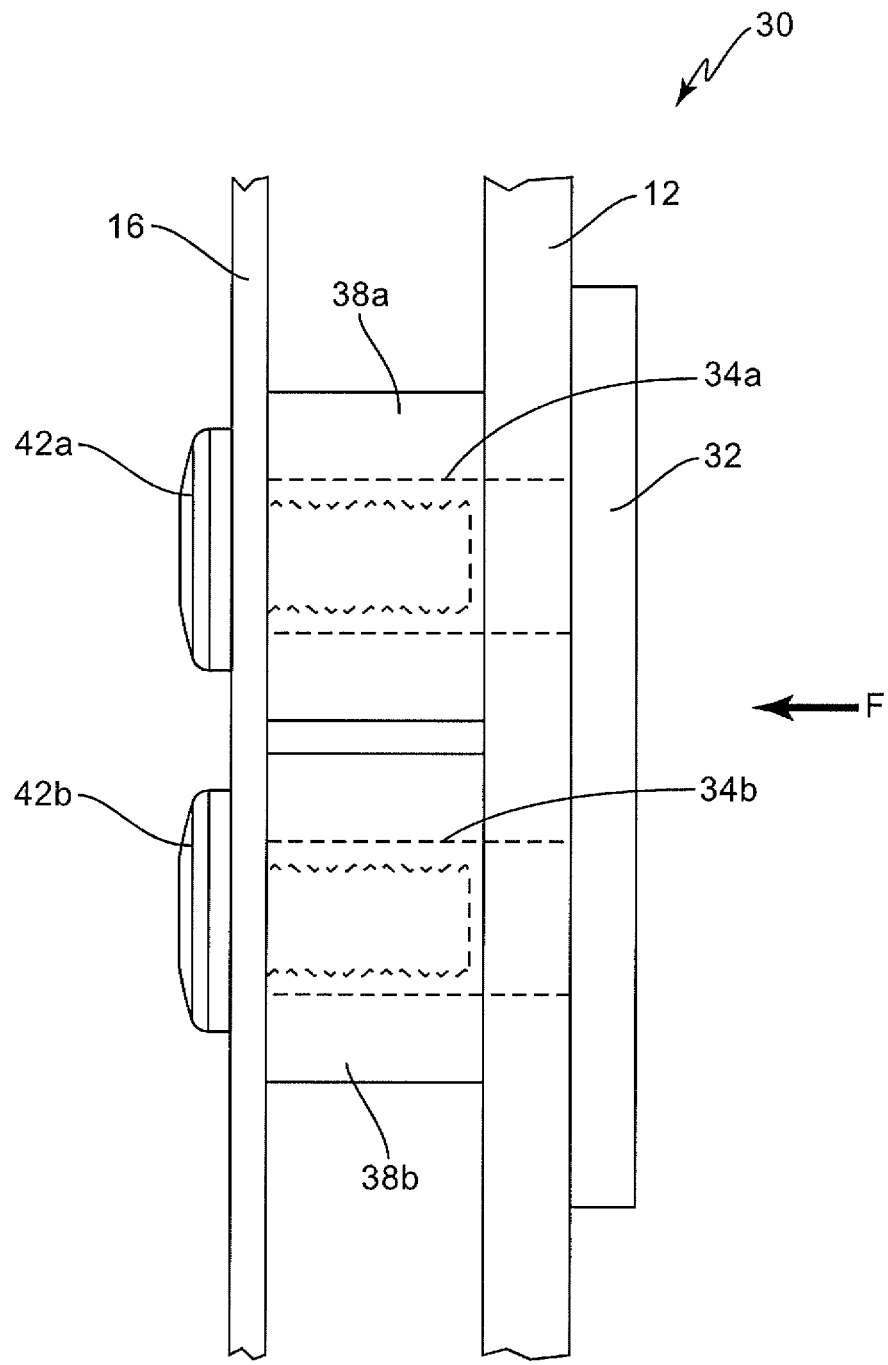
FIG. 4 is a sectional view illustrating the mounting assembly attaching the face shield to the protective headgear according to one embodiment of the present invention.

FIG. 4 is a sectional view illustrating the face shield 16 mounted to the helmet 12. For clarification, each component part of the mounting assembly 30 retains its previous reference number. However, FIG. 4 indicates separate ones of the same component using the letters "a" and "b." Thus, the first and second posts 34 are indicated as first and second posts 34a, 34b, respectively.

As seen in FIG. 4, the posts 34a, 34b are fixedly attached to the base 32 and extend outwardly from base 32. Posts 34 extend outwardly from base 32, through the holes 20 formed in helmet 12, and into the through holes 40 of spacers 38a, 38b, respectively. The spacers 38 ensure that the helmet 12 remains disposed between the base 32 and the spacers 38a, 38b, respectively. The fasteners 42a, 42b extend through the slots 18 formed in the face shield 16, and into the corresponding threaded receptacles 36 of posts 34a, 34b. Each of the opposing surfaces of base 32 is substantially planar and has a surface area that is generally greater than that of a T-nut. Thus, base 32 has a first surface on which the user may apply a force F during the installation and/or removal of the shield 16 to maintain the opposing second surface of base 32 against the interior surface of helmet 12.

As previously stated, one of the problems with conventional visor attachment mechanisms is that they are difficult to handle and manipulate while installing and removing the face shield 16. This is partially because the face shield 16 has a tendency to bias away from the helmet, which can cause the screws and the other small attachment components to become lost. With the present invention, however, the components of the mounting assembly 30 remain substantially in-place and connected to the helmet 12 during the installation and removal processes. This eases the processes for the people who maintain such equipment, and greatly reduces the chance of a component being "flung" across a room and lost. Additionally, since the components remain attached to the helmet 12 once installation of the mounting assembly 30 is complete, the person removing the face shield 12 to utilize his or her hands for other tasks.

Figure 5A:
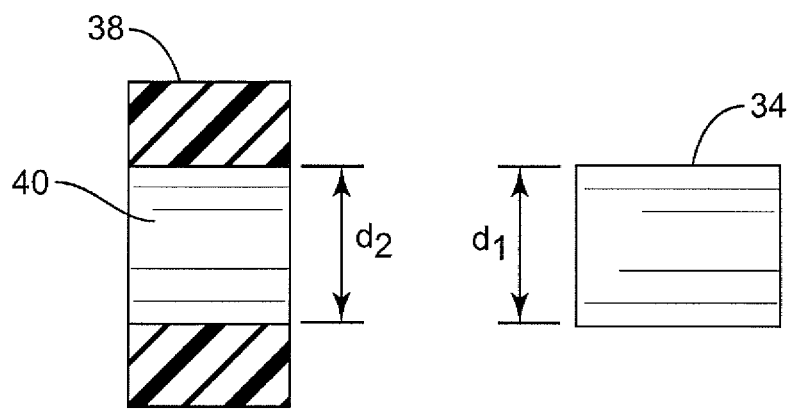
FIG. 5A is a sectional view illustrating a spacer and post according to one embodiment of the present invention.
Figure 5B:
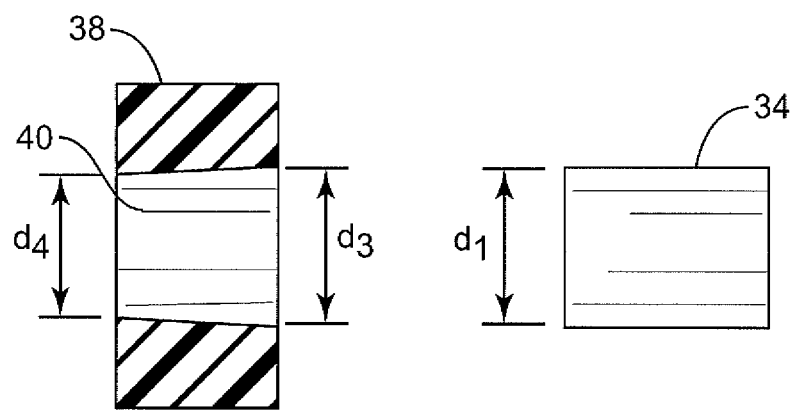
FIG. 5B is a sectional view illustrating a spacer and post according to another embodiment of the present invention.

FIGS. 5A-5B are sectional views illustrating how the present invention may accomplish this aspect according to different embodiments of the present invention. Specifically, the through hole 40 of each spacer 38 is sized to frictionally engage the outer surfaces of the posts 34 when the posts 34 are inserted through the holes 20 in the side of helmet 12. To accomplish this, each post 34 is formed to have an outer diameter $d_1$. The through hole 40 of the corresponding spacer 38, however, may be formed to have a slightly different diameter. In one embodiment (FIG. 5A), the hole 40 has an inner diameter $d_2$ that is substantially equal to, or slightly smaller than, the outer diameter $d_1$ of post 34. The diameter $d_2$ should be such that there is a yielding resistance imparted to the user when placing the spacer 38 over the post 34. However, once in place, the spacer 38 should not freely separate from the post without some force being applied by the user to intentionally remove the spacer 38.

In another embodiment, (FIG. 5B), the hole 40 is tapered. Specifically, the hole 40 is formed to have two slightly different diameters $d_3$, $d_4$. The first diameter $d_3$ is slightly larger than the outer diameter $d_1$ of post 34 to facilitate the user initially sliding the spacer 38 over the post 34. However, the second diameter $d_4$ is slightly smaller than the outer diameter $d_1$ to ensure that the spacer 38 will not freely separate from the post 34 without the user intentionally applying a predetermined amount of force to remove the spacer.

Figure 6:
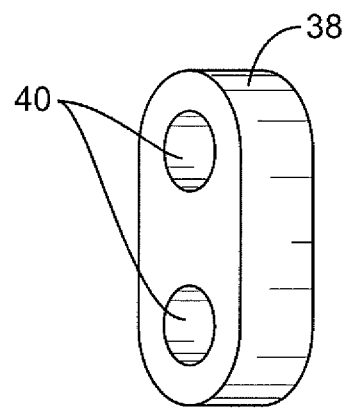
FIG. 6 is a perspective view illustrating a spacer assembly component of the mounting assembly configured according to one embodiment of the present invention.

FIG. 6 illustrates another embodiment of the spacer assembly utilized in the mounting assembly 30. In previous embodiments, the spacer assembly comprised a pair of independent spacers 38, each having their own hole 40 to receive corresponding posts 34. In this embodiment, however, the spacer assembly comprises an elongated, single, unitary spacer 38 having a pair of spaced-apart holes 40. As stated previously, the through holes 40 in spacers 38 are sized and shaped to yieldingly resist the user's efforts at placing the spacer over the post 34. It also yieldingly resists the user's efforts at removing the spacer 38 from post 34 thereby preventing the spacer 38 from becoming freely detached from post 34. Thus, once installed, the spacers 38 function to retain or "lock" the base 32 and the posts 34 to the helmet 12, thereby preventing the mounting assembly 30 from inadvertently becoming detached from the helmet 12. Although not specifically shown in FIG. 6, the spacer 38 may also include the ridges R sized to fit into slots 18.

Figure 7:
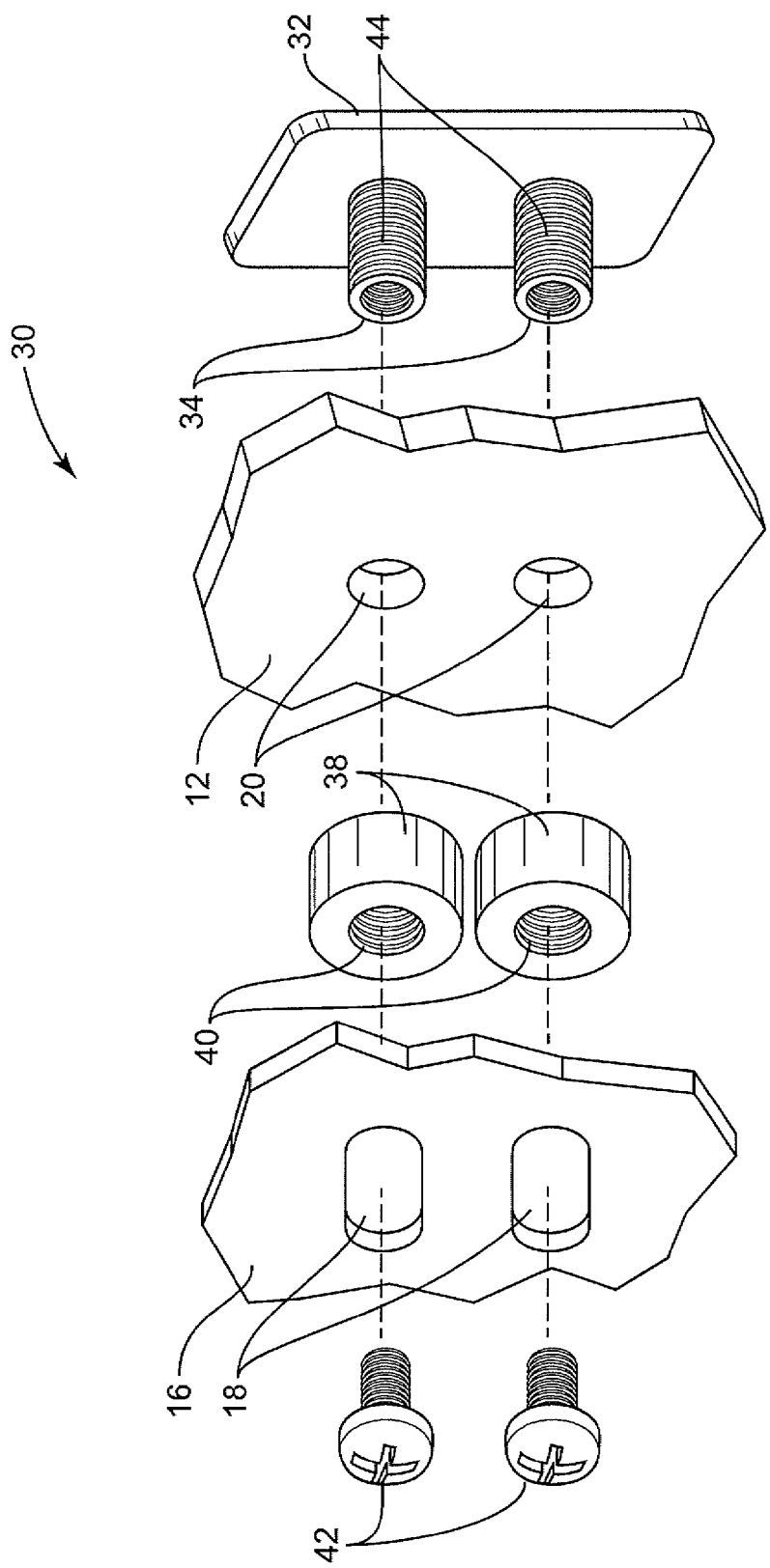
FIG. 7 is an exploded view illustrating the mounting assembly attaching a face shield to protective headgear according to another embodiment of the present invention.

FIG. 7 illustrates another embodiment of the mounting mechanism 30 in which the external surfaces 44 of posts 34 are threaded. The internal surfaces of the holes 40 on spacers 38 are also correspondingly threaded. It should be noted that while FIG. 7 shows both spacers 38 having threaded holes 40, this is not required. One or both of the holes 40 may be threaded as needed or desired. To attach the face shield 16, the user places the threaded posts 34 through the holes 20 in helmet 12. The user then threads one or both of the spacers 38 onto the threaded post(s) 34. This will retain the spacer 38 on the post 34, even when the user removes the face shield 16 from helmet 12.

Figure 8:
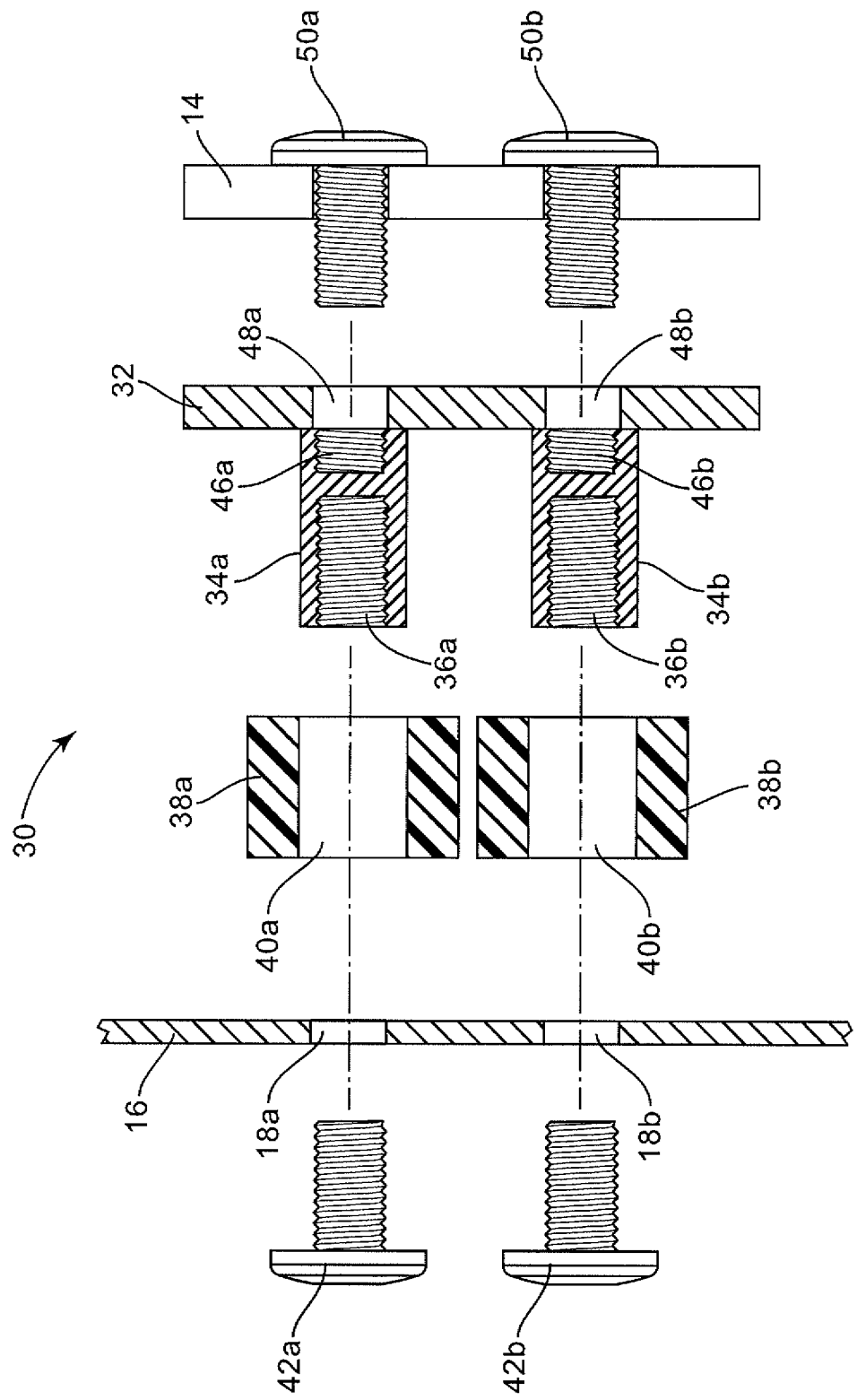
FIG. 8 is an exploded-sectional view illustrating how the mounting assembly attaches a face shield to protective headgear according to yet another embodiment of the present invention.

FIG. 8 illustrates another embodiment wherein one or both of the posts 34 are threaded to receive two different sets of mechanical fasteners. Particularly, as previously stated, each post 34a, 34b has a first threaded interior receptacle 36a, 36b to threadingly receive the mechanical fasteners 42a, 42b that retain the face shield 16 to the helmet 12. In addition to these receptacles, however, each post 34a, 34b also includes a second threaded interior receptacle 46a, 46b formed in the opposing end of the post. The second threaded receptacles 46a, 46b are threaded in the opposite direction of the first threaded receptacles 36a, 36b, and are configured to receive corresponding fasteners 50a, 50b via a hole 48a, 48b formed in the base 32. The fasteners 50a, 50b may be utilized to hold the protective foam 14 against the interior surface of the helmet 12. It should be noted that, although FIG. 8 illustrates both posts 34a, 34b as comprising a second threaded receptacle 46, this is not required. Those skilled in the art will readily appreciate that one or both of the posts 34a, 34b may include both a second threaded receptacle 46.

The present invention may, of course, be carried out in other ways than those specifically set forth herein without departing from essential characteristics of the invention. For example, the posts 34 seen in the embodiments are all cylindrically-shaped. However, the present invention is not so limited. Those skilled in the art will appreciate that the posts 34 may be any shape and size desired. Therefore, the present embodiments are to be considered in all respects as illustrative and not restrictive, and all changes coming within the meaning and equivalency range of the appended claims are intended to be embraced therein.

What is claimed is:

1. A mounting assembly for attaching a face shield to a protective helmet, the assembly comprising:
    a unitary base having a planar surface configured to contact an opposing surface disposed on an interior of the helmet;
    first and second posts fixedly connected to the unitary base in a side-by-side relationship and extending outwardly from the planar surface of the base, the first and second posts configured to be inserted through corresponding holes in the helmet and to receive one or more mechanical fasteners to releasably attach the face shield to the helmet; and
    a spacer assembly comprising:
        first and second spacers, each spacer having a central through hole sized to frictionally engage a corresponding one of the first and second posts when the posts are inserted through the corresponding holes in the helmet, so that terminal ends of the first and second posts are substantially flush with, or below, a surface of the first and second spacers when the face shield is attached to the helmet; and
        at least one raised ridge formed on the surface of at least one of the first and second spacers and sized to insert into a slot in the face shield when the face shield is attached to the helmet; and
    wherein the spacer assembly is configured to slide over the first and second posts when the posts are inserted through the corresponding holes in the helmet so that the helmet is disposed between the planar surface of the base and the spacer assembly, and to frictionally engage outer surfaces of the first and second posts.

2. The mounting assembly of claim 1 wherein the through hole in the first spacer has a diameter that is larger than or substantially equal to an outer diameter of the first post.

3. The mounting assembly of claim 1 wherein one or both of the first and second posts comprises:
    a first interior receptacle formed in a first end and configured to threadingly receive a mechanical fastener to attach the face shield to the helmet; and
    a second interior receptacle formed at a second opposing end and configured to threadingly receive another mechanical fastener to attach padding disposed on the helmet interior to the base.

4. The mounting assembly of claim 3 wherein threads formed in the first interior receptacle are opposite threads formed in the second interior receptacle.

5. A face shield assembly for mounting to a protective helmet, the assembly comprising:
    a face shield;
    a mounting assembly configured to mount the face shield to the helmet, the assembly comprising:
        a unitary base having a planar surface configured to contact an opposing surface disposed on an interior of the helmet;
        first and second posts fixedly connected to the unitary base in a side-by-side relationship and extending outwardly from the planar surface of the base, the first and second posts configured to be inserted through corresponding holes in the helmet and to receive one or more mechanical fasteners to releasably attach the face shield to the helmet; and
    a spacer assembly comprising:
        a first spacer and a second spacer, each spacer having a centrally-located through hole sized to frictionally engage a corresponding one of the first and second posts when the posts are inserted through the corresponding holes in the helmet, so that terminal ends of the first and second posts are substantially flush with, or below, a surface of the first and second spacers when the face shield is attached to the helmet; and
        a raised ridge formed on the surface of at least one of the first and second spacers, the ridge being sized to fit into a slot in the face shield when the face shield is attached to the helmet; and
    wherein the spacer assembly is configured to slide over the first and second posts when the posts are inserted through the corresponding holes in the helmet so that the helmet is disposed between the planar surface of the base and the spacer assembly, and to frictionally engage outer surfaces of the first and second posts.

6. The face shield assembly of claim 5 wherein the through hole in the first spacer has a diameter that is larger than or substantially equal to an outer diameter of the first post.

7. The face shield assembly of claim 5 wherein one or both of the first and second posts comprises:
    a first interior receptacle formed in a first end and configured to threadingly receive a mechanical fastener to attach the face shield to the helmet; and
    a second interior receptacle formed at a second opposing end and configured to threadingly receive another mechanical fastener to attach padding disposed on the helmet interior to the base.

* * * * *